United States Patent [19]

Chen

[11] Patent Number: 5,504,634
[45] Date of Patent: Apr. 2, 1996

[54] VIDEO TAPE CASSETTE ADAPTER

[75] Inventor: Stephen Chen, Changhua, Taiwan

[73] Assignee: E Lead Electronic Co., Ltd., Changhua, Taiwan

[21] Appl. No.: 313,808

[22] Filed: Sep. 28, 1994

[51] Int. Cl.⁶ .......................... G11B 23/04; G11B 15/665
[52] U.S. Cl. ................................ 360/94; 360/132
[58] Field of Search .............................. 360/94, 95, 96.5, 360/132; 242/336, 340, 347.1, 347.2

[56] References Cited

U.S. PATENT DOCUMENTS

| | | | |
|---|---|---|---|
| 4,470,560 | 9/1984 | Yoneya et al. | 360/94 |
| 4,554,603 | 11/1985 | Tsuchiya | 360/94 |
| 4,566,048 | 1/1986 | Tokunaga et al. | 242/336 |
| 4,622,605 | 11/1986 | Tsuruoka et al. | 242/336 |
| 4,994,926 | 2/1991 | Chen | 360/94 |
| 5,016,834 | 5/1991 | Sato et al. | 242/336 |
| 5,333,078 | 7/1994 | Chen | 360/94 |
| 5,365,387 | 11/1994 | Chen | 360/94 |

FOREIGN PATENT DOCUMENTS

| | | | |
|---|---|---|---|
| 58-118071 | 7/1983 | Japan | 242/336 |
| 58-130477 | 8/1983 | Japan | 360/94 |
| 58-143474 | 8/1983 | Japan | 360/94 |
| 58-155584 | 9/1983 | Japan | 360/94 |
| 58-212671 | 12/1983 | Japan | 360/94 |
| 59-16175 | 1/1984 | Japan | 360/94 |

*Primary Examiner*—Stuart S. Levy
*Assistant Examiner*—David L. Ometz
*Attorney, Agent, or Firm*—Browdy and Neimark

[57] ABSTRACT

An improved tape cassette adapter uses a mono-directionally operable motor having a worm rod attached to the end of the output shaft thereof that is engaged with a speed variation gear set. The last gear of the gear set having an eccentrically disposed vertical driving pole is associated with a securing board to which a limiting guide board is rotatably mounted. The limiting guide board and a left swing arm are operationally engaged with the vertical driving pole of the last gear. The limiting guide board is further engaged with a horizontally movable slide linkage rod. The likage rod is further linked to a slide board which is coupled to a pivotal right swing arm. A cam block disposed on the linkage rod is slidably in abutment against a power switch block so as to control the on and off of the motor in order to get the tape of a tape cassette stretched out or withdrawn back in operation.

7 Claims, 8 Drawing Sheets

VIDEO TAPE CASSETTE ADAPTER

BACKGROUND OF THE INVENTION

The present invention relates to an improved video tape adapter and more particularly to an adapter for adapting a compact tape cassette used in a video camera to a general VHS tape player. The present adapter uses a mono-directionally operable motor instead of a bi-directional motor so as to simplify the structure of a tape adapter, and reduce malfunctions or disorders in operation thereof.

Various tape adapters have been widely used by people who own a compact-size video camera because those compact tape cassettes adapted for use in such a video camera cannot be played in a common VHS video player.

The general prior art tape adapter makes use of a bi-directional motor which can get a tape out stretched or withdrawn back when the motor operates in either direction. However, such kinds of prior art adapter are relatively costly because more mechanical components are required in manufacturing the same. Moreover, the motor and components in such a conventional adapter are apt to wear out, causing relatively high failure rate.

SUMMARY OF THE INVENTION

The primary object of the present invention is to provide a tape cassette adapter for a video camera which uses a mono-directional motor in association with a limiting guide board and a linkage rod that are driven via a gear set by the motor so that the one directional motion of the motor and the gear set can make a left swing arm and a right swing arm be pivotally actuated accordingly, getting the tape of a compact tape cassette out-stretched and withdrawn back easily.

Another object of the present invention is to provide an automatic tape cassette adapter that is simple in structure and relatively low in production cost and is free from frequent malfunctions.

DETAILED DESCRIPTION OF THE PREFERRED EMBODIMENT

Figure 1:
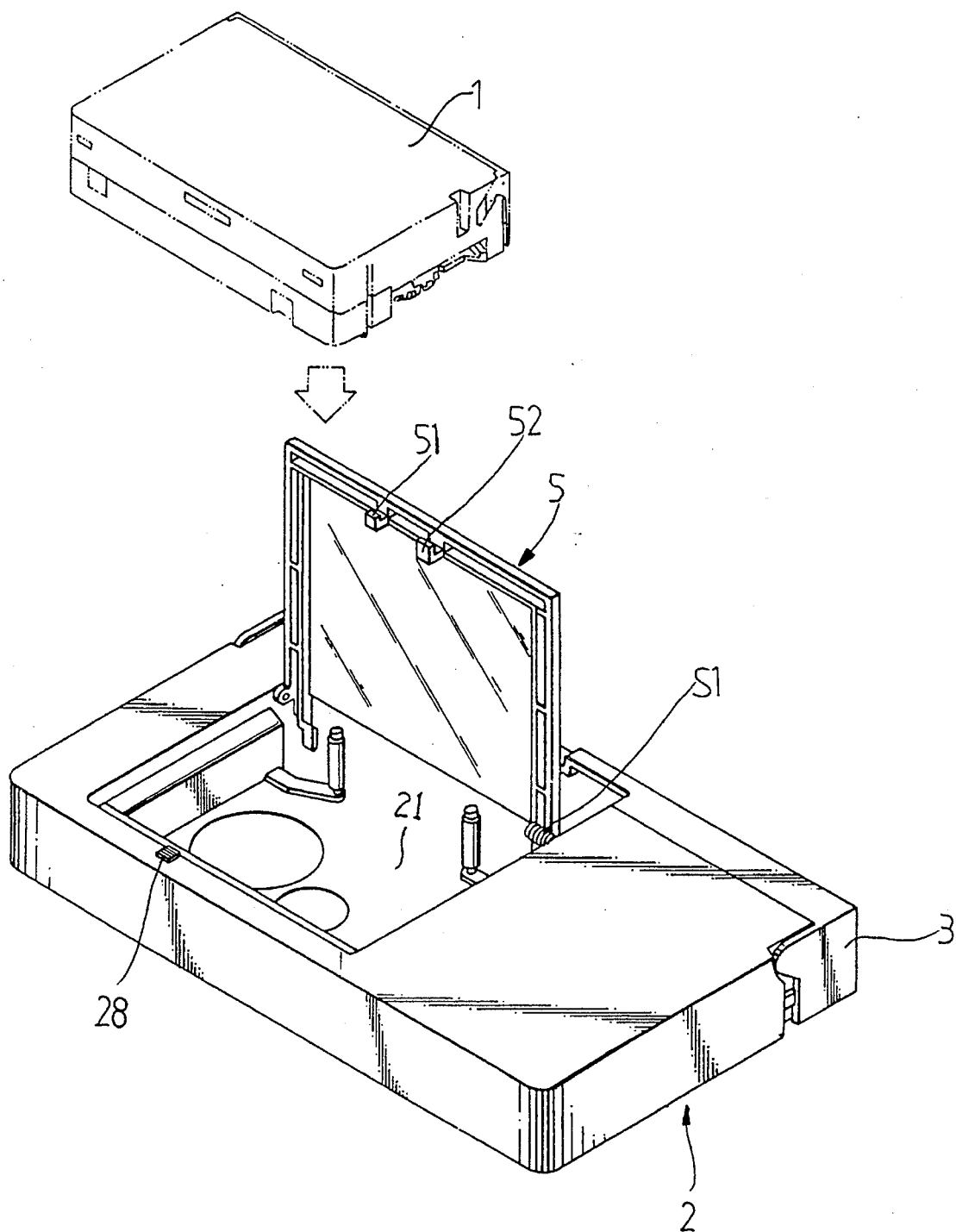
FIG. 1 is a perspective diagram showing the mounting a compact tape castte in the adapter of the present invention.
Figure 2:
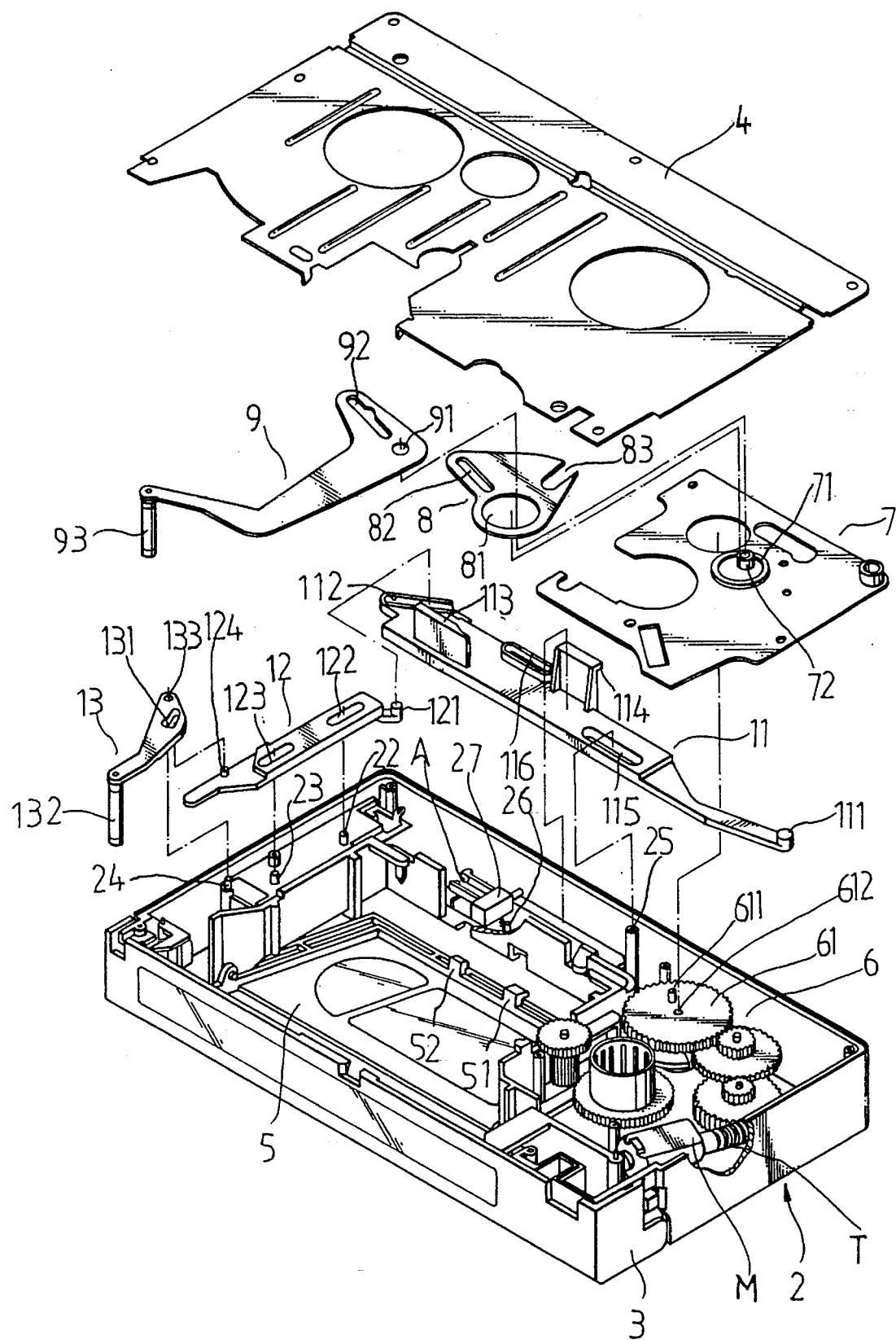
FIG. 2 is a perspective diagram showing the exploded components thereof.

Referring to FIGS. 1 and 2, a tape cassette adapter of the present invention has an embodiment case 2 which is equipped with a pivotally openable front lid 3 and a bottom cover 4 and a opening 21 disposed at the top side thereof for location of a compact tape cassette 1 into the embodiment case 2 with a liftable flap lid 5. Inside the embodiment case 2 and adjacent to one side thereof is disposed a mono-directional motor M having a worm rod T extended from the output shaft of the motor M. The worm rod T is engaged with a speed variation gear set 6.

The last gear 61 of the gear set 6 is provided with a vertical driving pole 611 and a securing board 7 is fixed to the gear set 6. A circular peripheral flange 71 is disposed on one side of the securing board 7 with a shaft sleeve 72 located at the center thereof. The shaft sleeve 72 is engaged to the central rotation shaft 612 of the last gear 61. The circular peripheral flange 71 is engaged to a round hole 81 on a limiting guide plate 8.

On the limiting guide plate 8 and next to the round hole 81 are disposed a close-ended slot 82 and a one-end opened slot 83. The close-ended slot 82 is disposed in alignment with a corresponding slot 92 disposed at one end of a left swing arm 9. Engaged with both the slots 82 and 92 is the vertical driving pole 611 of the last gear 61 of the gear set 6. The driving pole 611 is confined so that it slides back and forth in the slots 82, 92 so as to make the tape driving pole 93 of the left swing arm 9 pivot so as to extend out and retract back a tape in synchronism with the right swing arm 13. Next to the close-ended slot 92 is disposed a through hole 91 in correspondence to the shaft sleeve 72 so as to pivotally engage the left swing arm 9 with the securing board 7.

The open-ended slot 83 of the limiting guide board 8 is engaged with a protruding post 111 disposed at one end of a linkage rod 11. At the opposite end of the linkage rod 11 is obliquely disposed an open-ended groove 112 in which a projection pole 121 disposed at one end of a slide board 12 is slidably confined. On the slide board 12 are disposed a pair of linearly located positioning slots 122, 123 with which are engaged the retaining poles 22, 23 disposed on the embodiment case 2 so as to limit the back and forth movement of the slide board 12.

Near the opposite end of the slide board 12 is disposed a vertical push rod 124 which is slidably engaged with a driving slot 131, of the right swing arm 13, urging the tape driving pole 132 of the right swing arm 13 to pivotally move back and forth.

A retaining hole 133 is disposed on the right swing arm 13 at the opposite end of the driving pole 132 and is engaged with a retaining pole 24 fixed on the embodiment case 2. Moreover, the linkage rod 11 is further provided with a cam block 113 and an retaining block 114 and limiting slots 115, 116. The limiting slots 115, are engaged with vertical poles 25, 26 disposed on the embodiment case 2 so that the linkage rod 11 is restrained in its horizontal back and forth movement. The retaining block 114 is in locking engagement with the hook 51 of the liftable flap lid 5 so as to prevent the lid 5 from disconnection from pivot shafts on the embodiment case 2 by the exertion of a bias spring S1.

Figure 4:
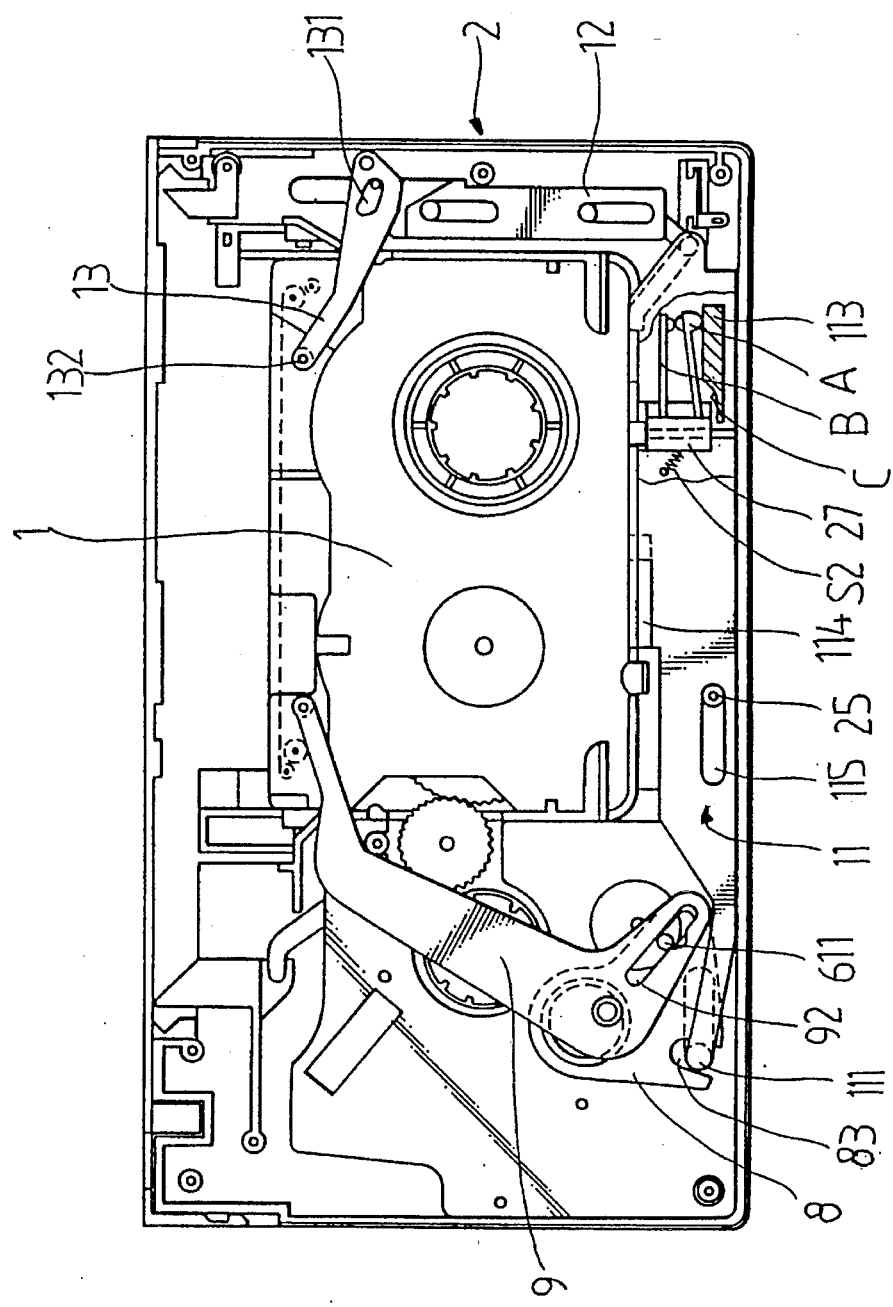
FIG. 4 is a diagram showing another operation mode thereof.

The cam block 113 disposed at the edge of the linkage rod 11 can actuate a slidable power switch block 27 which can also be actuated by a push button 28 and a push hook 52 of the lid 5 when the linkage rod 11 slides horizontally from left to right or vice versa so that metallic conducting arms A, B can be urged into an on state or separated into an off state, as shown in FIG. 4, permitting the left and right swing arms 9, 13 to be actuated either to get a tape extended out or pulled back.

Figure 3:
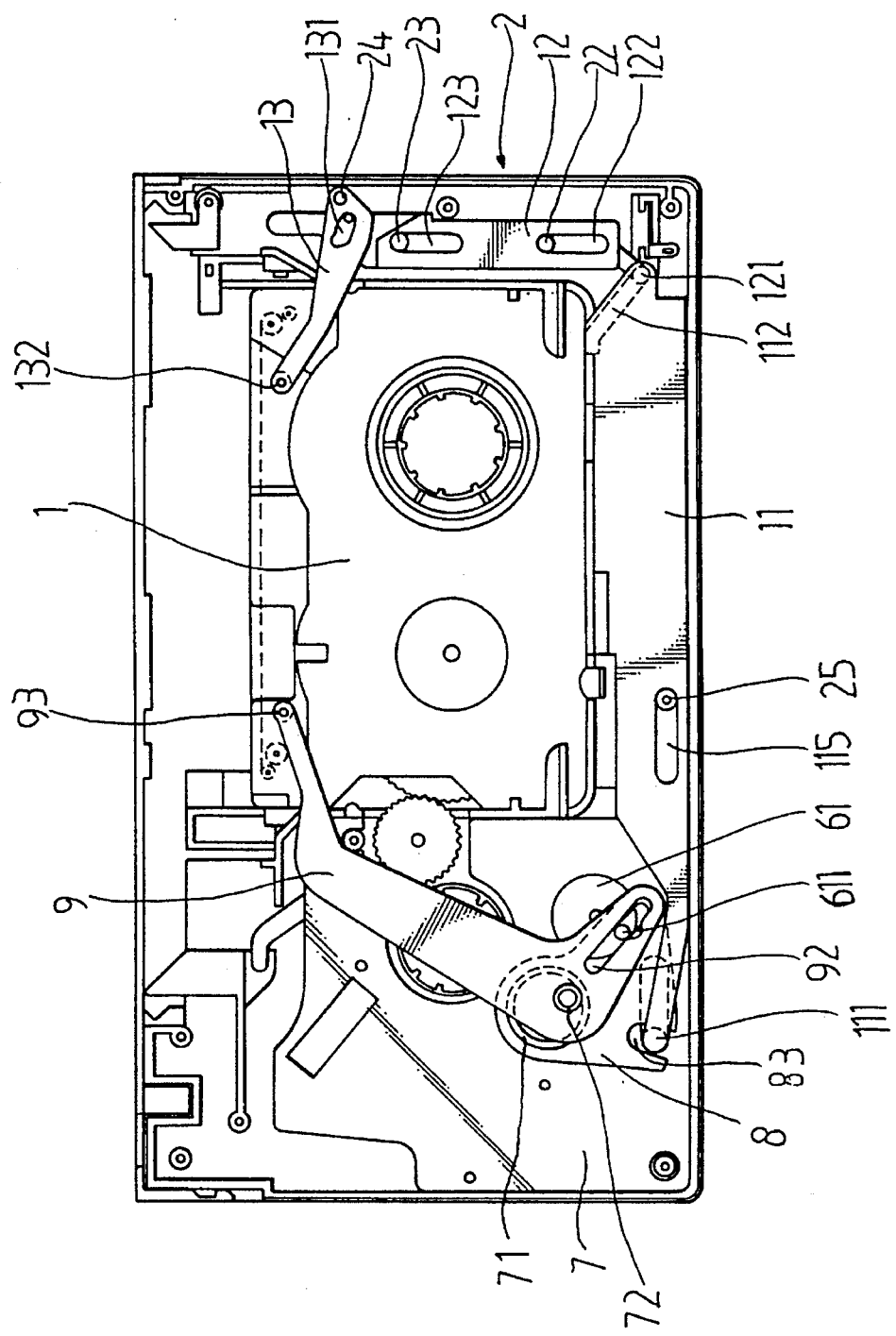
FIG. 3 is a diagram showing the operation mode of the present invention.

Referring to FIGS. 3, 4, when a compact tape cassette 1 is put into the embodiment case 2, the liftable flap lid 5 is shut down, the push hook 52 disposed at the front edge of the flap lid 5 urges the power switch block 27 to move forward, causing the conducting arms A, B to come into tight abutment against the cam block 113 so as to electrically turn on the motor M. The worm rod T connected to the motor M and engaged with the speed varying gear set 6 can drive the gear set accordingly. The eccentric vertical driving pole 611 on the last gear 61 of the gear set 6 can drive the limiting guide board 8 to move accordingly by way of the close ended slot 82, resulting in the movement of the left swing arms 9; simultaneously, the linkage rod 11 is forced to linearly move by way of the open-ended slot 83 of the limiting guide board 8. When the linkage rod 11 moves toward left, the retaining block 114 becomes engaged with the locking hook 51 so as to prevent the flap lid 5 from bouncing open.

Figure 5:
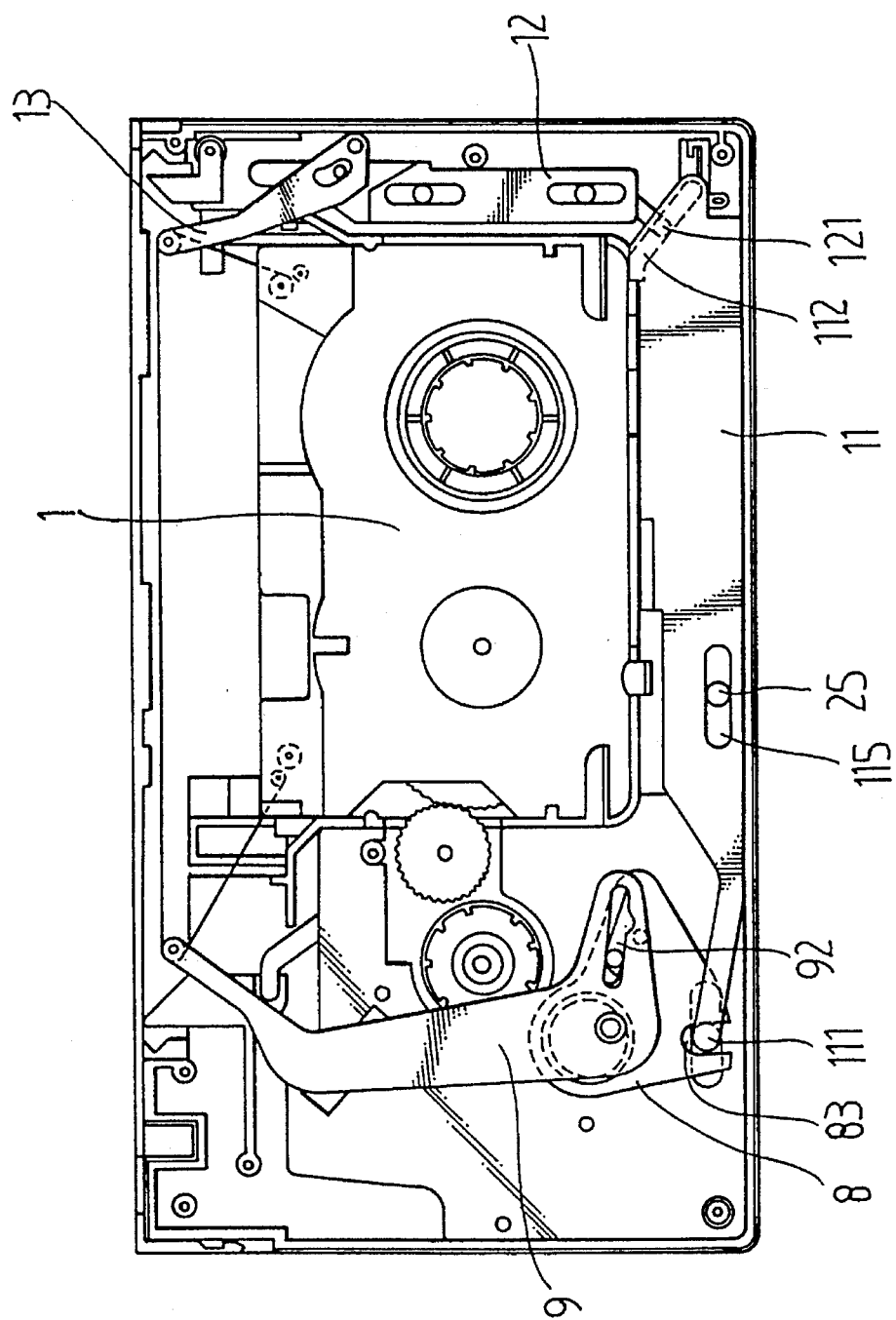
FIG. 5 is a diagram showing another operation mode thereof.
Figure 6:
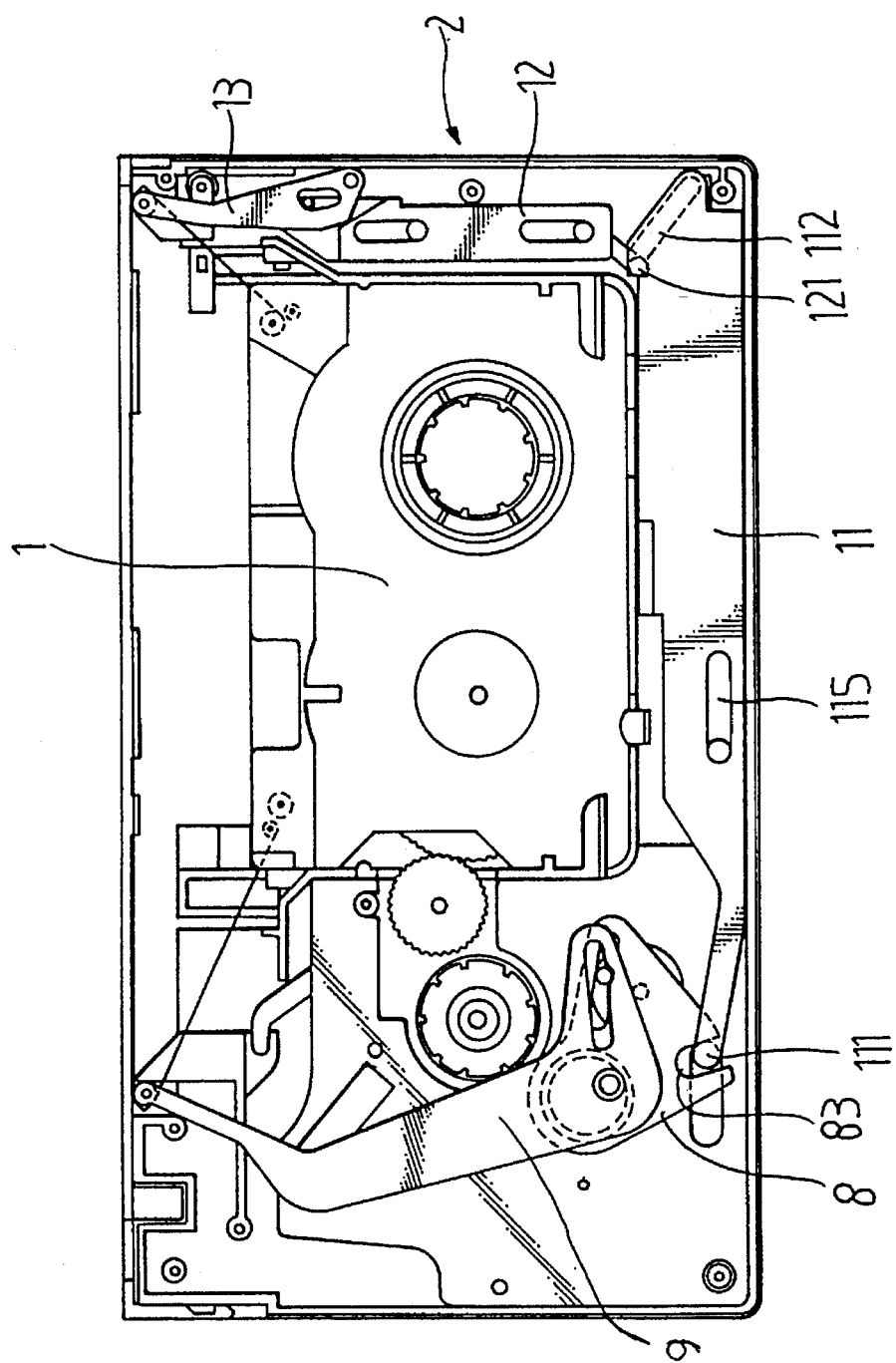
FIG. 6 is a diagram showing another operation mode thereof.
Figure 7:
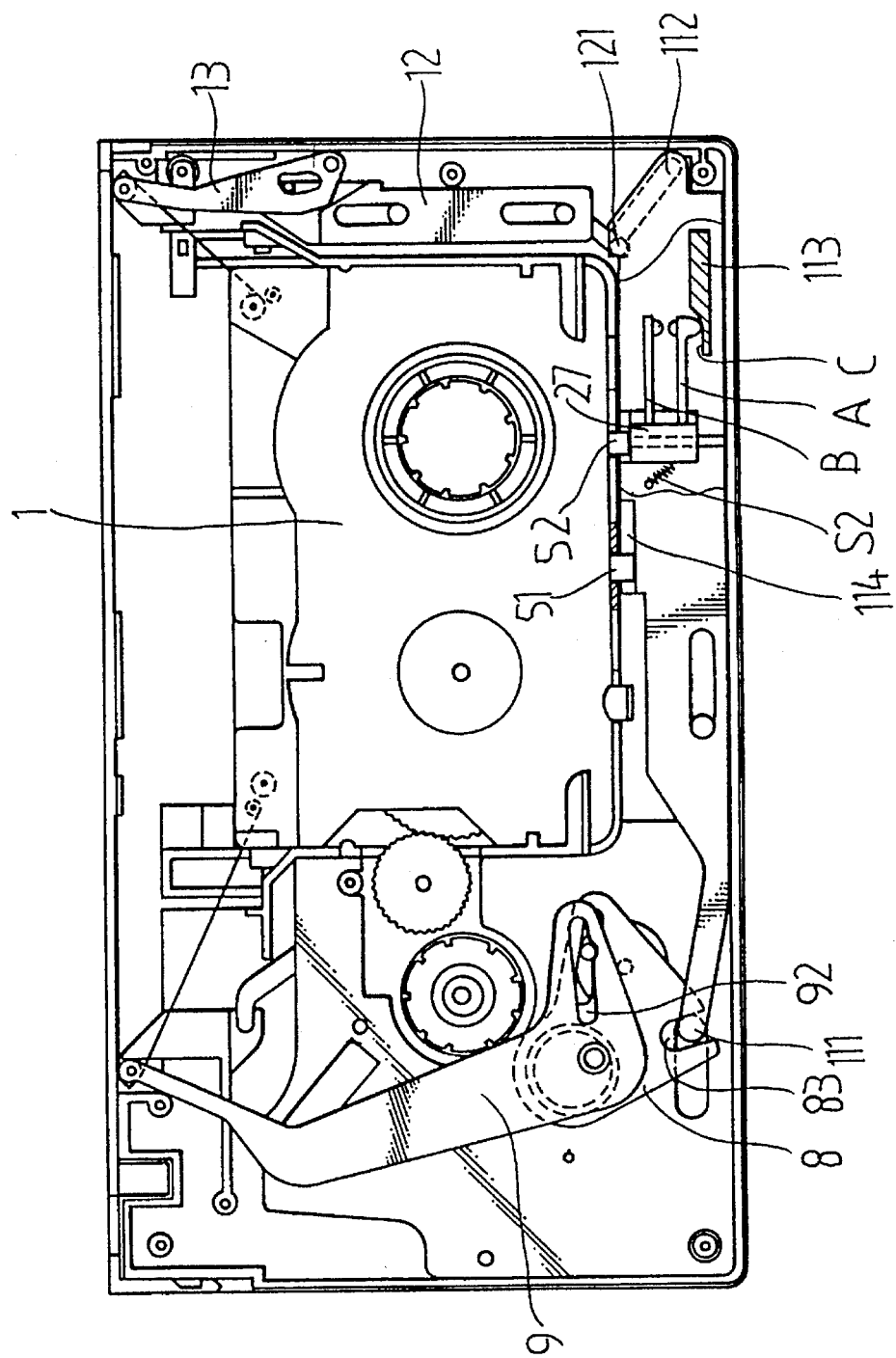
FIG. 7 is a diagram showing the completion of stretch out of a tape cassette.

As further shown in FIGS. 5, the slide board 12 and the right swing arm 13 are simultaneously driven by the linkage rod 11 due to the engagement of the projection pole 121 with the open ended groove 112 of the linkage rod 11, causing the left and right swing arms 9, 13 to pivot outwardly so as to get the tape stretched out. As the left and right swing arms 9, 13 come to a full extension position, the cam block 113 comes to such a position that the recessed portion C permits the conducting arm A to go free from the pressing of the slide block 113, cutting off the electrical power supply to the motor M, as shown in FIGS. 6, 7. Thus, the tape is fully streched out accordingly.

Figure 8:
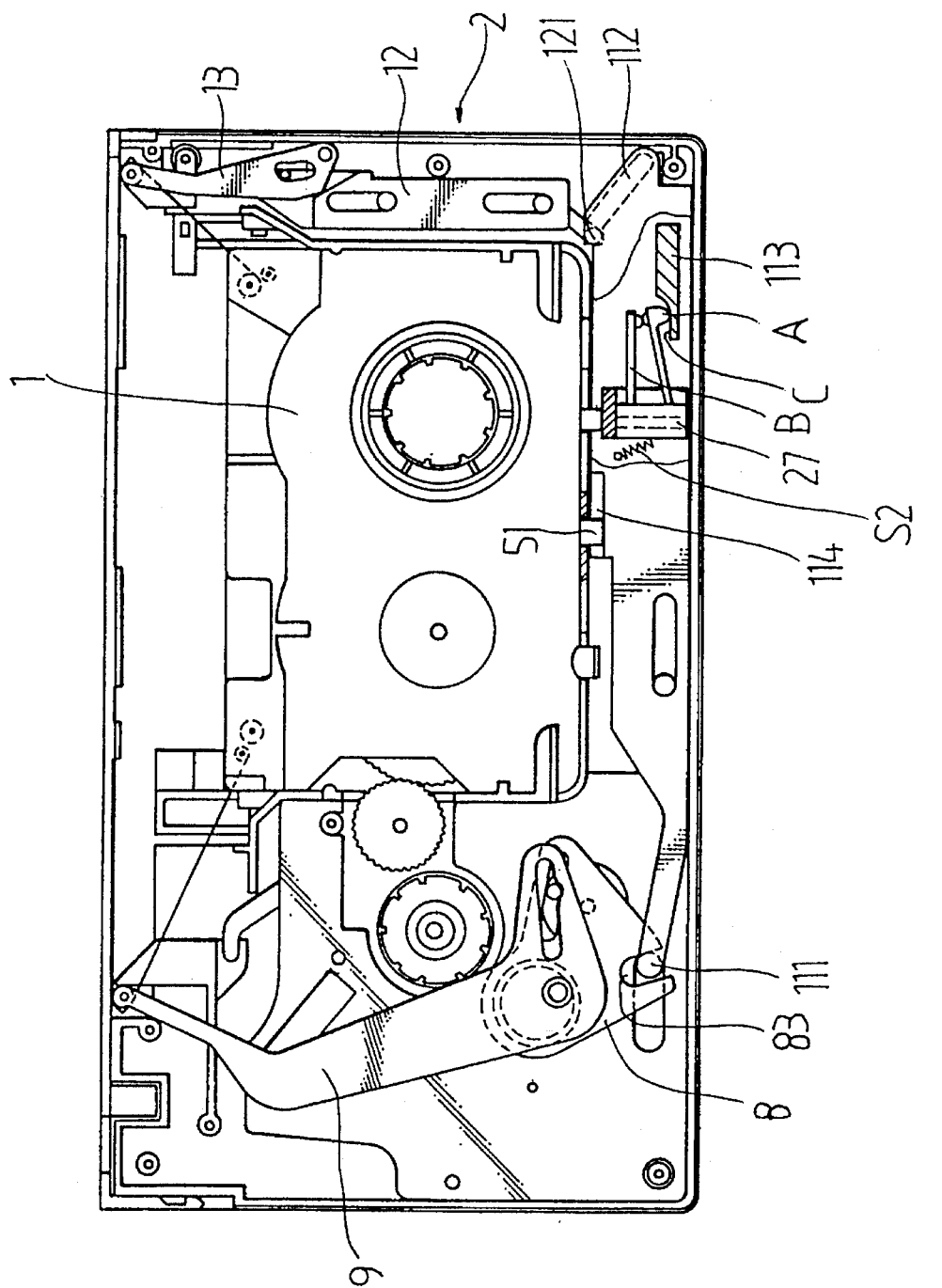
FIG. 8 is a diagram showing the conducting arms abutting against each other again so as to acutate the motor to pull the out-stretched tape back.

To pull the out-stretched tape back, one only has to push the operation button 28 outwardly, forcing the power switch block 27 to keep the conducting arms A, B abutting against each other once again so that the motor is startled again to drive the limiting guide board 8 to withdraw back with the left swing arm 9 pulled backwardly, as shown in FIG. 8. In the meanwhile, the linkage rod 11 actuates the slide-board 12 and the right swing arm 13 which is pivoted inwardly, permitting the out-stretched tape to withdraw until the retaining hook 114 is disengaged from the locking hook 51, i.e. at a position where the tape is completely withdrawn back. Then, the flap lid 5 will be pulled open by the bias spring S1, and the push hook 52 stops abutting against the slidable power switch block 27. Simultaneously, the spring S2 will get the switch block 27 to resume to its non-operation position, the conducting arms A, B come to separate, completing a tape withdrawing operation.

It can be clearly seen that the present invention adopts a mono-directional motor in cooperation with linkage mechanism for replacement of a conventional bi-directional motor so that defects in a prior art can be effectively solved. Furthermore, the parts in such a tape cassette can be simplified and the cost of production of such adapter can be lowered accordingly. Besides, malfunctions in such adapter of the present invention can be effectively reduced.

I claim:

1. A video tape cassette adapter having a mono-directional motor, comprising:

an embodiment case for housing a compact tape cassette for use in a video camera, said embodiment case having a liftable flap lid which can be opened for receiving the compact tape cassette;

the mono-directional motor having an output shaft to which is attached a worm rod;

a speed variation gear set engaged with said worm rod of said mono-directional motor;

a last output gear of said gear set having an eccentric vertical driving pole disposed thereon;

a pivotal left swing arm for control of the stretch-out and withdraw of a tape of said compact tape cassette, said pivotal left swing arm having a vertical tape driving pole;

a pivotal right swing arm operating in synchronism with said left swing arm, said pivotal right swing arm having a vertical driving pole for control of the stretch-out and withdraw of the tape of said compact tape cassette;

a power switch block means having a pair of conducting arms for controlling the on and off of said mono-directional motor;

a securing board mounted onto said gear set;

a limiting guide board rotatably engaged with said securing board;

said left swing arm disposed on top of said limiting guide board and said securing board wherein said left swing arm is pivotally engaged with said securing board;

said left swing arm and said limiting guide board both having an elongated slot, each said elongated slot being disposed in alignment with each other and said eccentric vertical driving pole of said last gear of said gear set engaged with each said elongated slot;

said right swing arm pivotally fixed at one end to said embodiment case;

a slide board having a pair of positioning slots disposed in line with each other being slidably engaged with first and second spaced retaining poles disposed on said embodiment case so that said slide board can be linearly moved back and forth within a fixed range;

a vertical push rod at a first end of said slide board, said right swing arm having a driving slot engaged with said vertical push rod on said slide board so that the linear movement of said slide board can drive said right swing arm to pivot clockwise or counter-clockwise;

a linkage rod having one end engaged with an open-ended slot of said limiting guide board and an opposite end having a guide groove engaged with a projection pole disposed at a second end of said slide board;

said linkage rod having a pair of linearly disposed limiting slots which are movably engaged with vertical poles on said embodiment case so that said linkage rod can limitedly move back and forth when driven;

said linkage rod having a switch actuating means for actuation of said switch block means so as to start or stop said mono-direction operating motor to drive said last gear of said gear set, causing said linkage rod to move back and forth linearly;

and said switch block means is slidably spring biased which can be pushed to abut against said switch actuating means to start said motor.

2. A video tape cassette adapter as claimed in claim 1 wherein said liftable flap lid has a push means which can force said spring biased power switch block means to come into engagement with said switch actuating means of said linkage rod when said flap lid is closed.

3. A video tape cassette adapter as claimed in claim 1 wherein said spring biased power switch block means can be actuated manually by a button means disposed on said embodiment case to abut against said switch actuating means so as to start said motor to operate.

4. A video tape cassette adapter as claimed in claim 1 wherein said spring biased power switch block means has said pair of metallic conducting arms which are separated in a non-operation state and are urged to abut against each other in an operation state whereby said mono-directional motor can be stopped or started accordingly.

5. A video tape cassette adapter as claimed in claim 4 wherein said switch actuating means on said linkage rod is a cam block which can urge said metallic conducting arms of said power switch block means to abut against each other for starting said motor and permit said conducting arms to separate from each other during said linkage rod being moved back and forth linearly.

6. A video tape cassette adapter as claimed in claim 1 wherein said securing board has a circular protruded peripheral flange on one side thereof and said limiting guide board has a through hole having a shape in conformance to said circular protruded peripheral flange so that said limiting guide board can be rotatably engaged with said securing board.

7. A video tape cassette adapter as claimed in claim 1 wherein said liftable flap lid has a locking means which can become engaged with and disengaged from a retaining means disposed on said linkage rod when said lid is shut and said linkage rod is driven back and forth in operation.

* * * * *